US007062758B2

(12) United States Patent
Yokoyama

(10) Patent No.: US 7,062,758 B2
(45) Date of Patent: Jun. 13, 2006

(54) FILE CONVERSION METHOD, FILE CONVERTING DEVICE, AND FILE GENERATING DEVICE

(75) Inventor: Toru Yokoyama, Hachioji (JP)

(73) Assignee: Hitachi, Ltd., Tokyo (JP)

(*) Notice: Subject to any disclaimer, the term of this patent is extended or adjusted under 35 U.S.C. 154(b) by 723 days.

(21) Appl. No.: 10/217,465

(22) Filed: Aug. 14, 2002

(65) Prior Publication Data

US 2003/0103073 A1 Jun. 5, 2003

(30) Foreign Application Priority Data

Dec. 4, 2001 (JP) ............................ P2001-369448

(51) Int. Cl.
*G06F 9/45* (2006.01)
(52) U.S. Cl. ....................................... 717/136
(58) Field of Classification Search ................ 717/107, 717/120, 136; 711/171, 202
See application file for complete search history.

(56) References Cited

U.S. PATENT DOCUMENTS

| | | | | |
|---|---|---|---|---|
| 5,604,900 A | * | 2/1997 | Iwamoto et al. ............ 707/205 |
| 6,088,304 A | * | 7/2000 | Aramaki et al. ......... 369/30.09 |
| 6,434,678 B1 | * | 8/2002 | Menzel ........................ 711/156 |
| 6,463,445 B1 | * | 10/2002 | Suzuki et al. ................ 707/200 |
| 6,523,046 B1 | * | 2/2003 | Liu et al. .................. 707/104.1 |
| 6,549,577 B1 | * | 4/2003 | Florencio et al. ...... 375/240.21 |
| 6,642,967 B1 | * | 11/2003 | Saunders .................... 348/714 |
| 6,751,623 B1 | * | 6/2004 | Basso et al. ................ 707/101 |
| 2002/0136406 A1 | * | 9/2002 | Fitzhardinge et al. ....... 380/210 |
| 2002/0157112 A1 | * | 10/2002 | Kuhn ........................ 725/113 |
| 2003/0061369 A1 | * | 3/2003 | Aksu et al. ................. 709/231 |
| 2004/0117427 A1 | * | 6/2004 | Allen et al. ................. 709/200 |

FOREIGN PATENT DOCUMENTS

| JP | 08-051631 | * | 2/1996 |
|---|---|---|---|
| JP | 2000-092497 | * | 3/2000 |
| JP | 2003046931 A | * | 2/2003 |

OTHER PUBLICATIONS

Basso, A; P;uri, A; Schmidt, RL; "Flexible Interchange of Coded Multimedia Facilitating Access and Streaming", p. 36-40, 1998 IEEE retrieved Jul. 20, 2005.*

Han, Keesook j; Tewfik, Ahmed H; "Fast polynomial Regression Transform for Video Database", p. 143-147, 1998 IEEE, retrieved Jul. 20, 2005.*

(Continued)

*Primary Examiner*—Wei Zhen
*Assistant Examiner*—Mary Steelman
(74) *Attorney, Agent, or Firm*—Reed Smith LLP; Stanley P. Fischer, Esq.; Juan Carlos A. Marquez, Esq.

(57) ABSTRACT

When the meta data in an MP4 file is converted, a media data recopying process involves a long process duration and large memory space allocation. The invention provides that when an MP4 file is converted, an increment of a converted file size is estimated based on previously-registered meta data conversion candidate information, an overwritable free space equivalent to the estimated incremental size is inserted before a media data portion. In the MP4 file conversion, the converted meta data overwrites the to-be-converted meta data portion and the overwritable free space such that the MP4 file is converted without moving the media data.

20 Claims, 13 Drawing Sheets

OTHER PUBLICATIONS

Hu, Michael J; Jian, Ye; "Multimedia Description Framework (MDF) for Content Description of Audio/Video Documents", p. 67-75, 1999 ACM, retrieved Jul. 20, 2005.*

Mohan, Rakesh; Smith, John R; Li, Chung-Sheng; "Adapting Multimedia Internet Content for Universal Access", p. 104-114, 1999 IEEE, retrieved Jul. 20, 2005.*

* cited by examiner

FIG. 1
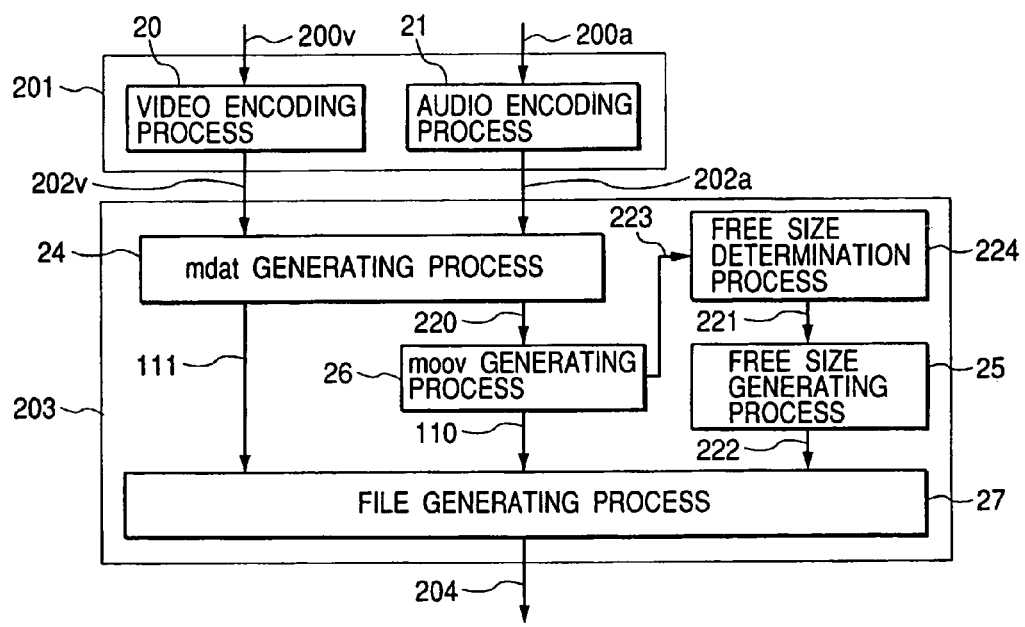
Prior Art  FIG. 2
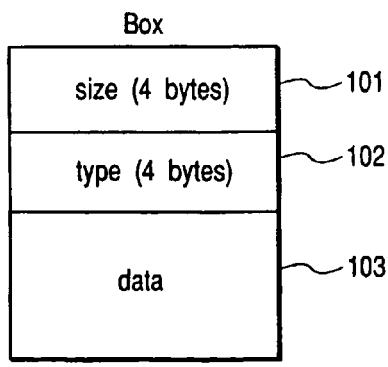

Prior Art  FIG. 4
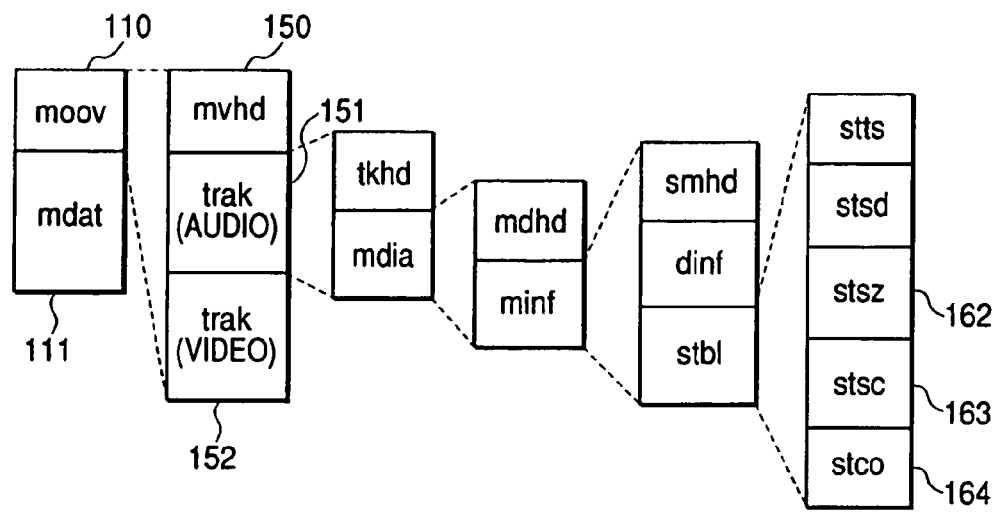
Prior Art  FIG. 5
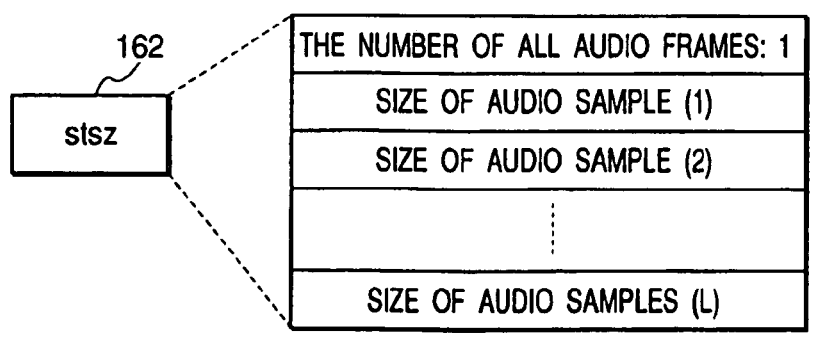

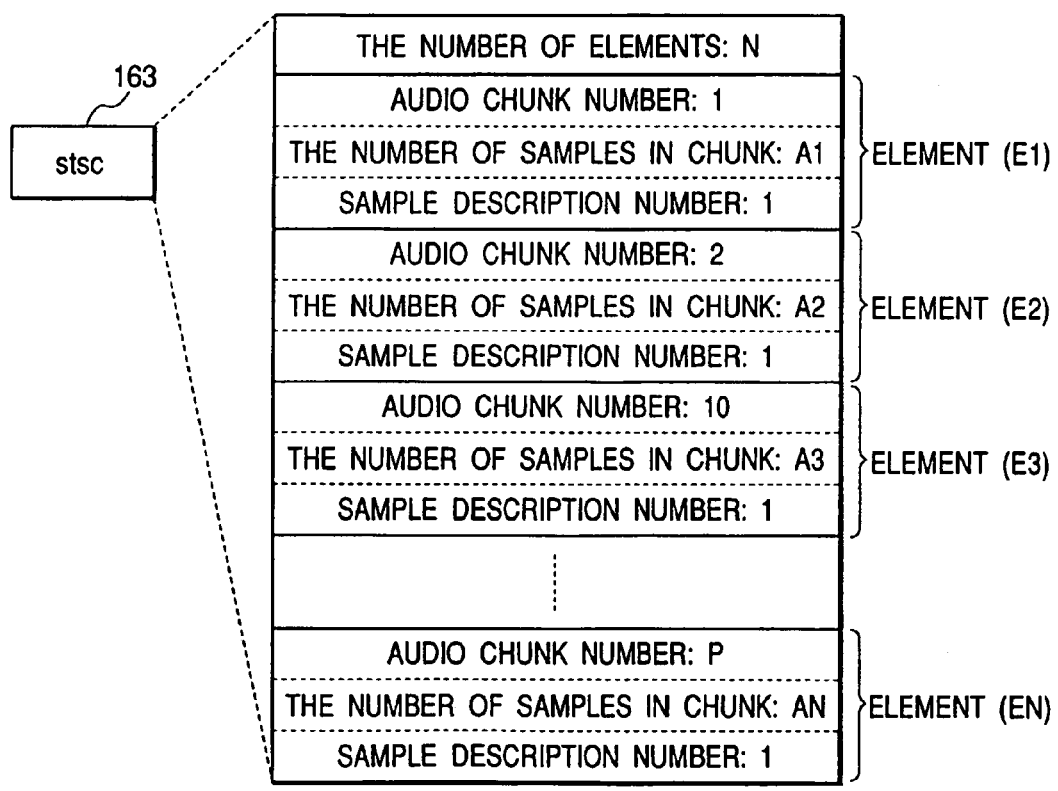
Prior Art FIG. 6

Prior Art FIG. 7
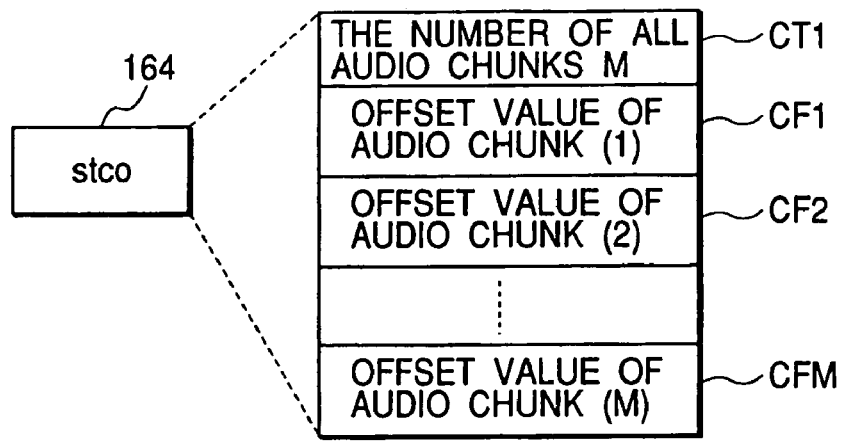
Prior Art FIG. 8
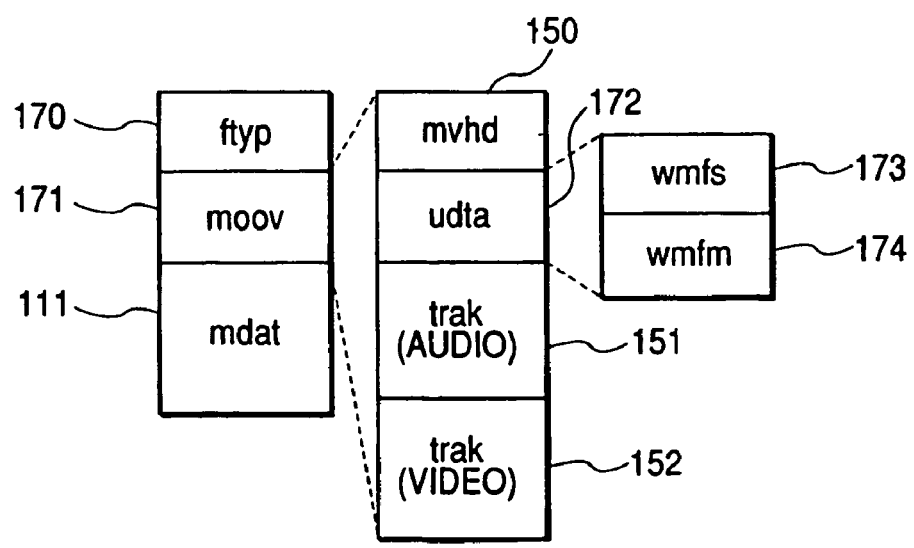

FILE CONVERSION METHOD, FILE CONVERTING DEVICE, AND FILE GENERATING DEVICE

FIELD OF THE INVENTION

The present invention relates to a device for storing, converting, and delivering multimedia data, particularly multimedia data with an MPEG-4 file format.

BACKGROUND OF THE INVENTION

Various data, such as video, music, audio, and texts, are integrally used in the multimedia environment. It is essential to digitalize data of information media, such as newspapers, magazines, televisions, radios, and telephones.

The data transmission rate of these information media is extremely large. A television quality video needs data transmission rate of 80 Mbps, while a telephone quality sound needs data transmission rate of 64 Kbps. During directly transmitting television image and sound data over a telecommunication line, the data transmission rate equivalent of about one thousand regular telephone lines generates. These digitized information media cannot be processed efficiently.

A data compression technology is required. The ISO has been standardizing the MPEG-4, a general multimedia encoding protocol, which allows video transmission at 64 kbps. The detailed description of MPEG-4 data compression technology is omitted here because it does not directly relate to the present invention.

In the MPEG-4 (ISO/IEC 14496-1), video data and audio data are multiplexed into one piece of data. The "MP4 file format" is the provided format for storing MPEG-4 contents. The MP4 file format stores information for synchronously reproducing the video data and audio data. The file format MP4 is designed to reproduce, transfer, maintain, and edit media data (expression data such as encoded video and audio data are hereinafter collectively referred to as "media data") easily. The MP4 file is reproduced in a system where the MP4 file itself is located, such as in a personal computer, or is converted to a streaming format used in a LAN and delivered in a streaming manner.

The file format MP4 is independent of any particular transmission system. In a server, the MP4 file stores information on characteristic of each transmission system as meta data. The server refers to the meta data which includes the transmission system information of the server. The server obtains information required for transmitting media data.

The media data in the MP4 file can be independently transmitted over various transmission systems.

FIG. 2 is a structure of a "box", a basic unit of an MP4 file. Each box comprises a size field 101 which identifies a size (number of bytes) of the box, a type field 102 which identifies a type of the box with a string of four characters, and a data field 103 which stores actual data of the box. The data field can store other boxes. The MP4 file has a hierarchal structure of these boxes.

A basic structure of the MP4 file is described in the following in reference to FIGS. 3 to 7.

A structure of a media data of the MP4 file is described in FIGS. 3A to 3C. FIG. 3A is the basic MP4 file structured with one meta data and one piece of media data. The meta data stores information required for decoding or reproducing the media data. A MovieBox (hereinafter referred to as an 'moov') 110 is a box which stores all meta data. A MediaDataBox (hereinafter referred to as an 'mdat') 111 is a box which stores all the media data.

FIG. 3B shows a structure inside the mdat. The mdat is structured with a sequence of a data unit called a "chunk." In FIGS. 3A to 3C, different types of media are arranged one after another (audio chunk (1)AC1, video chunk (1)VC1, audio chunk (2)AC1, video chunk (2)VC2, and so on). The MP4 file format does not define the order of chunks and the number of chunks in the mdat. FIG. 3C is a structure inside each chunk, which is structured with consecutive "samples" of one media type. The sample is a minimum encoded data unit, which can be separated from other samples and represents a data unit equivalent to one frame of video or audio data. In FIG. 3C an audio chunk (1)AC1 includes consecutive audio samples (1)AS1 to (A1)ASA1, and a video chunk (1)VC1 includes consecutive video samples (1)VS1 to (V1) VSV1. The MP4 file format does not define the number of samples in each chunk.

FIG. 4 shows a structure inside the moov. The boxes of FIG. 4 are defined as required boxes for the MP4 file format. Other type boxes may be optionally stored in the MP4 file. The moov 110 is structured with a MovieHeaderBox (hereinafter, an 'mvhd') 150 which represents header information, and a plurality of a TrackBox (hereinafter, a 'trak'). The trak is a box which stores information on each media, such as video, audio, still images, characters, etc., forming a scene of the MP4 file.

FIG. 4 shows the moov structured with a TrackBox (hereinafter, a 'trak') 151 which contains audio data, and a trak 152 which contains video data. Each track has a hierarchy made with a number of boxes. The respective traks 151 and 152 include a SampleSizeBox (hereinafter, 'stsz') 162, a SampleToChunkBox (hereinafter, 'stsc') 163, and a ChunkOffsetBox (hereinafter, 'stco') 164. The operations of these boxes are briefly described in the following. Other boxes are detailed in the ISO/IEC 14496-1: 2001. The description of the other boxes is omitted here because they do not relate to the present invention.

FIG. 5 illustrates in detail an stsz 162. The stsz 162 is a box which contains information on a size (number of bytes) of each sample in each media, and is used in accessing a given data piece in an mdat. Each of the traks 151 and 152 contains one stsz 162 as a required box.

FIG. 6 illustrates in detail an stsc 163. The stsc 163 is a box which contains information on samples, such as frames, (the number of samples and a description index of samples) of each chunk in each media, and is used in accessing a given data piece in an mdat. Each of the traks 151 and 152 contains one stsc 163 as a required box.

FIG. 7 illustrates an stco 164 in detail. The stco 164 is a box which contains file offset values of each chunk in each media. Each of the traks 151 and 152 contains one stco 164 as a required box. The stco 164 contains the number of all the audio chunks CT1 (in FIG. 7, M is defined as the number of all the audio chunks) and first offset values (CF1 to CFM) of M number of audio chunks. The first offset value of a chunk means an offset value of a first byte of a first sample which is one of the samples forming a chunk. The first offset values (CF1 to CFM) of the audio chunks are the offset values of the first bytes of the first samples (AS1, ASA1, and so on) of the audio chunks (AC1, AC2, and so on) described in FIGS. 3A to 3C.

The position and size information of a given sample of media in an MP4 file are obtained with reference to the information contained in the stsz 162, the stsc 163, and the stco 164. When one sample is specified according to a sample number, the following identification process is performed. The information in the stsz 162 represents the specified sample size. The stsc 163 represents a number of a chunk which contains the specified sample. The stsz 162 represents a size S from the first sample in the chunk which contains the specified sample to just before the specified sample. The stco 164 represents a first position T of the chunk which contains the specified sample. By adding the first position T to the size S from the first sample in the chunk which contains the specified sample to just before the specified sample, the first position of the specified sample is obtained. As described above, the position and the size of a given sample in a file is obtained by analyzing the stsz 162, the stsc 163, and the stco 164 in each trak (151, 152) such that a given sample data is read out from the file.

In the MP4 file format standardized by the ISO/IEC 1446-1: 2001, in addition to the above-described required box, an optional box which is available when required, or a user-defined box may exist. The vendors of the MP4 file reproducing devices employ various optional boxes in their products. Thus an MP4 reproducing device which supports one optional box may not reproduce correctly MP4 files which contain other optional boxes.

It is common that an application supports a uniquely required box to meet its own specific requirement, and that the file specification of the application adds the unique required box to the required boxes for the respective MP4 file format. Therefore the required boxes of the MP4 file format may vary depending on file specifications of applications.

The Wireless Multimedia Forum (hereinafter, WMF) or the like, which is established to realize a platform for wireless delivery of multimedia contents, defines a streaming delivery specification, the RTFD (Recommended Technical Framework Document) Version 1.1 (hereinafter referred to as RTFD 1.1). The RTFD 1.1 employs the MP4 file format as a storing format of multimedia contents in a delivery server. It strongly recommends some optional required boxes, and defines a WMF-specific box as a required box of the RTFD 1.1-defined MP4 file format.

FIG. 8 illustrates a structure of the RTFD 1.1-defined MP4 file format. In the RTFD 1.1, a FileTypeBox (hereinafter, an 'ftyp') 170 is defined as a required box. In addition a UserDataBox (hereinafter may be called a 'udta') 172 always exists in the moov 171, and the udta 172 always contains a WMFSetSessionAtom (hereinafter may be called a 'wmfs') 173 and a WMFSetMediaAtom (hereinafter may be called a 'wmfm') 174, which are both the WMF-specific boxes. These boxes are detailed in the RTFD 1.1. Other boxes of FIG. 8 (mdat 111, mvhd 150, trak 151, trak 152) are the same as described above.

Even MP4 file format-compliance encoded media data (or mdats) may respectively have different box structures contained in moovs. When an application-compliance required box does not exist in an moov of an MP4 file, the application may not reproduce the MP4 file. In this case, the application can reproduce the MP4 file by converting only the moov (by adding the application-compliance required box), without changing the mdat.

In the above-described prior art, when the moov is positioned before the mdat, and when a size of the converted moov increases, the position change of the mdat within an MP4 file is required. Thus after the moov is written, rewriting of the mdat is required. FIG. 23 conceptually illustrates a conventional converting process of an MP4 file. In FIG. 23, an MP4 file comprised of moov 110 and mdat 111 is converted to an MP4 file (defined by the RTFD 1.1) comprised of an ftyp 170, an moov 171, and an mdat 111. In the case of the above-described conversion, first, a sufficient temporary space 180 is made on a memory or disk. The moov 171 is generated based on the ftyp 170 and the mdat 111, and then is copied in the temporary space 180. Next the mdat 111 is unchangingly copied in the temporary space 180. The conversion of the MP4 file completes by deleting the original moov 110 and the original mdat 111. If necessary, the converted MP4 file is moved from the temporary space 180 to a specified space. When the duration of an encoded scene of the MP4 file becomes longer, the mdat size becomes extremely large. Therefore the duration for rewriting the mdat becomes extremely long. Additionally a memory size for a temporary space, which is required for copying the mdat before the conversion of the moov, becomes large.

When the mdat position changes within an MP4 file, the stco in the moov needs to be rewritten. Therefore when the scene duration of the MP4 becomes long, the duration for rewriting stco also becomes long.

To solve the above-described problems, an object of the present invention is to provide a storing device and a file converting device which enable an efficient file conversion of multimedia data file, particularly an efficient file conversion performed by converting meta data format (moov) in an MP4 file format, with less memory space occupation.

SUMMARY OF THE INVENTION

The storing device of the present invention provides means for inserting an overwritable free space before a space taken by the media data. The overwritable free space is inserted into a first media data file to form an intermediate media data file which is to be overwritten with converted meta data such that there is no need to change the position of media data to convert a media data file between two media file formats. Therefore when a meta data format is converted, the temporary copying and rewriting of media data become unnecessary.

To determine an overwritable free space size of the overwritable free space, the storing device of the present invention contains information on different meta data formats so as to estimate the converted meta data size. By inserting an overwritable free space of a size equal to or larger than the estimated change of the meta data size, it is almost certain that only the overwriting of the overwritable free space (rather than the area storing the media data) after converting the meta data is required.

A data converting device of the present invention detects a size of data before the media data in the media data file (to be converted), and overwrites the space before the media data accordingly. The meta data format can be converted without changing the media data position. Therefore when the meta data format is converted, the temporary copying and rewriting of the media data is not necessary.

In addition, the data converting device of the present invention contains information on candidates for the meta data conversion.

In addition, the data converting device of the present invention determines whether or not a size of the data before the media data of a to-be-converted file format is equal to or larger than that of a converted into file format. Therefore, before overwriting the inserted an overwritable free space during the file conversion, the data converting device determines whether or not the file conversion is possible. If the available space for overwriting is insufficient, the data converting device performs an alternative process.

BRIEF DESCRIPTION OF THE DRAWINGS

The foregoing and additional features and characteristics of the present invention will become more apparent from the following detailed description considered with reference to the accompanying drawings in which like reference numerals designate like elements and wherein:

FIG. 1 is a block diagram of an MP4 file generating device according to the first embodiment of the present invention.

FIG. 2 is a block diagram of a structure of a box which is a basic unit of a conventional MP4 file.

FIG. 4 is a block diagram of a box structure of an moov in the conventional MP4 file.

FIG. 5 is a block diagram of a structure of an stsz of the conventional MP4 file.

FIG. 6 is a block diagram of a structure of an stsc of the conventional MP4 file.

FIG. 7 is a block diagram of a structure of an stco of the conventional MP4 file.

FIG. 8 is a block diagram of a structure of a box in the conventional MP4 file defined by the WMF (RTFD 1.1).

DETAILED DESCRIPTION OF THE PREFERRED EMBODIMENTS

The preferred embodiments of the present invention are described in detail in the following with reference to the appended drawings.

Figures 3A, 3B, 3C:
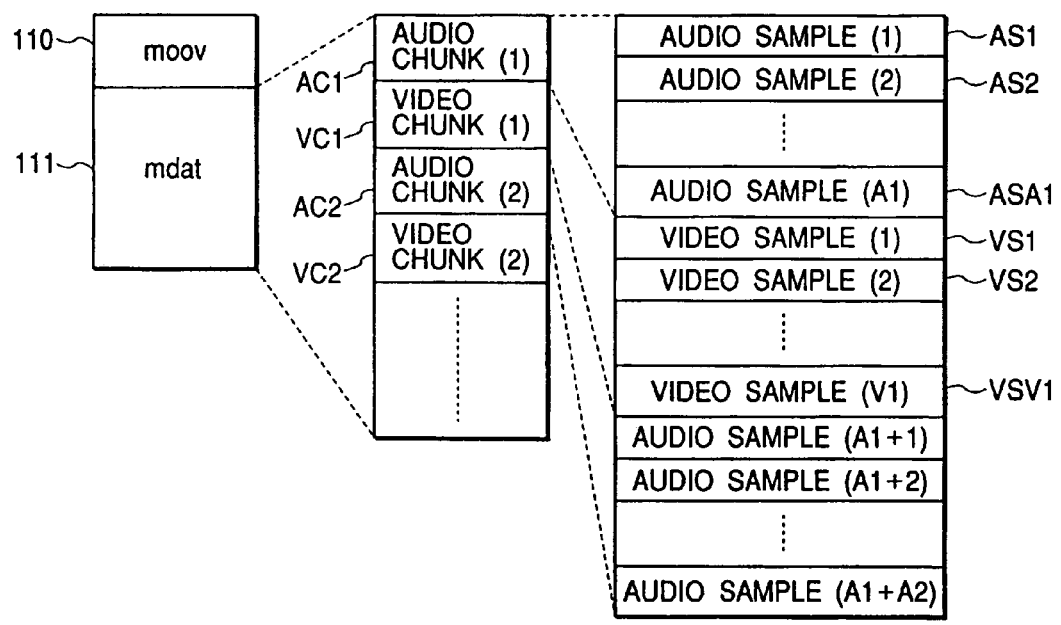
FIGS. 3A to 3C indicate a block diagram of a structure of an mdat in the conventional MP4 file.
Figure 9:
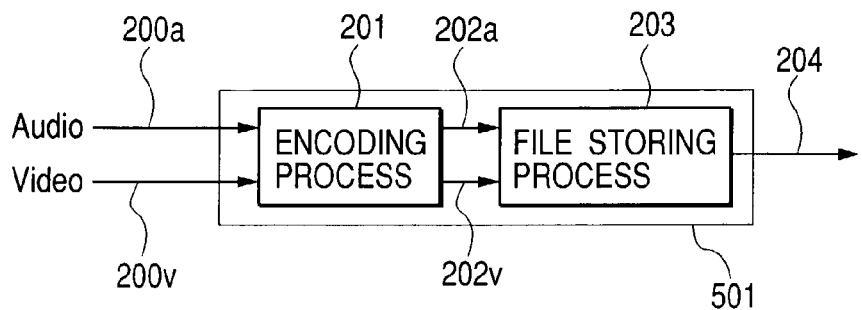
FIG. 9 is a block diagram of an MP4 file generating device according to the first embodiment of the present invention.

FIG. 9 is a block diagram of a structure of an MP4 file generating device 501 according to a first embodiment of the present invention. In the MP4 file generating device 501, video data 200v and audio data 200a are encoded through an encoding process 201. The encoded video data 202v and encoded audio data 202a are output and stored as MP4 files 204 through a file storing process 203.

Figure 10:
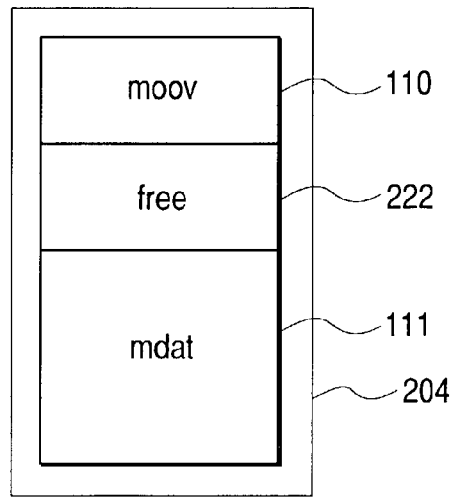
FIG. 10 is a block diagram of an MP4 file structure generated by the MP4 file generating device according to the first embodiment of the present invention.

FIG. 1 is a detailed block diagram of the encoding process 201 and the file storing process 203 within the MP4 file generating device 501. The video data 200v and the audio data 200a are compressed and encoded through a video encoding process 20 and an audio encoding process 21, respectively in the encoding process 201. The compressed and encoded video data 200v and audio data 200a are transmitted to an mdat generating process 24 within the file storing process 203 such that an mdat 111 is generated. Internal structure information 220 (the number of tracks, the number of samples, sample sizes, the number of chunks, the number of samples in a chunk, and so on) of the mdat 111 is transmitted to an moov generating process 26 such that an moov 110 is generated. The file storing device of the first embodiment of the present invention determines a free size 221, which is inserted into the MP4 file when the MP4 file is generated, through a free size determination process 224. The term 'overwritable free space' means a FreeSpaceBox of the MP4 file format, the FreeSpaceBox into which an overwritable free space is inserted. The overwritable free space of the FreeSpaceBox hereinafter is referred to as an 'overwritable free space'. The detail of a free size determining process 224 is described below. An overwritable free space 222 of the free size 221 is generated in a free size generating process 25. In a file generating process 27, as shown in FIG. 10, the MP4 file 204 in which the overwritable free space 222 is positioned before the mdat 111 is generated according to the mdat 111, the moov 110, and the overwritable free space 222, and then is stored.

Figure 11:
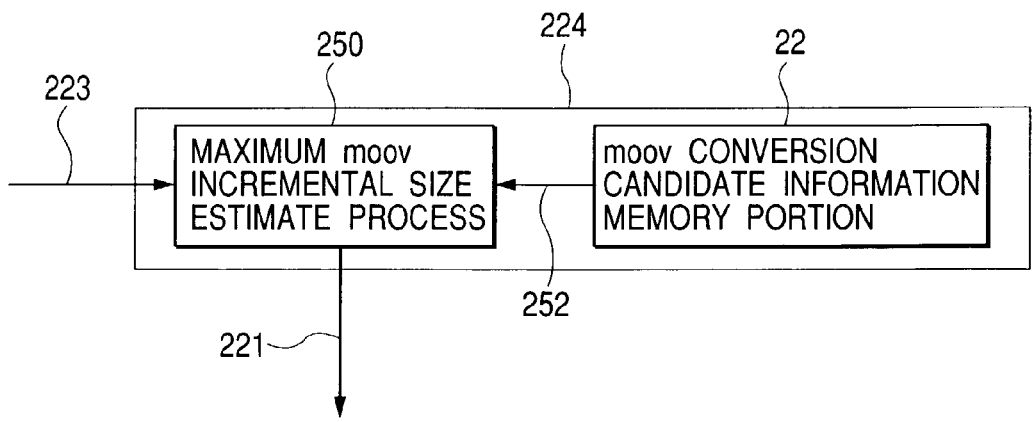
FIG. 11 is a detailed block diagram of a free size determination process in the MP4 file generating device according to the first embodiment of the present invention.

FIG. 11 is a detailed block diagram of the free size determination process 224. The free size determination process 224 comprises an moov conversion candidate information memory portion 22 and a maximum moov incremental size estimate process 250. The moov conversion candidate information memory portion 22 stores plural pieces of information on an moov to which the moov 110 generated through the moov generating process 26 will be converted (with a relieved converting process). The conversion according to the first embodiment of the present invention means that, in converting an MP4 file comprised of only the required boxes defined by the ISO/IEC 14496-1: 2001 to an MP4 file which complies with a delivery method defined by the WMF. A WMF-compliance moov 171 rewrites only the moov 110 without rewriting the mdat 111. The MP4 file thus adapts to the WMF. The moov conversion candidate information memory portion 22 is hereinafter described in detail.

A maximum moov incremental size estimate process 250 obtains an estimate value of a maximum moov incremental size in reference to the moov conversion candidate information memory portion 22 and information 223 on the moov 110 generated through the moov generating process 26. The maximum moov incremental size means an incremental size value of the largest moov conversion candidate among the moov conversion candidates stored in the conversion candidate information memory portion 22, the incremental size value being obtained by comparing the largest moov conversion candidate to a current moov 111 The maximum moov incremental size estimate process 250 outputs the estimate value of the moov incremental size as a minimum free size 221. The maximum moov incremental size estimate process 250 hereinafter is described in detail. In other words, a free size 221, is equals to or larger than the moov incremental size, i.e., the difference between the largest moov conversion size supported by the system minus a moov size of interest.

Figure 12:
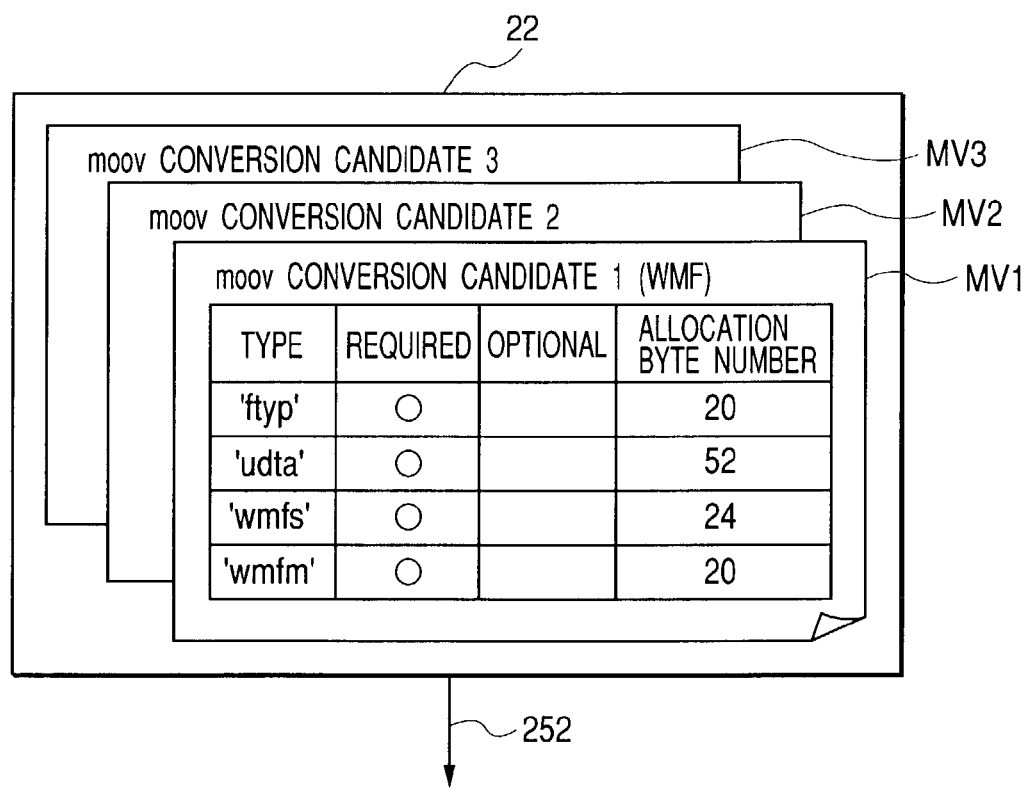
FIG. 12 is an explanation diagram of an moov conversion candidate information memory portion in the MP4 file generating device according to the first embodiment of the present invention.

The conversion candidates information memory portion 22 stores a plurality sets of the moov conversion candidate information. FIG. 12 illustrates in detail the conversion candidates information memory portion 22. The conversion candidates information memory portion 22 stores as many information on the moov candidates (MV1, MV2, and MV3) as the number of the candidates (in FIG. 12 the number of the candidates is three). In FIG. 12, for example, the first moov conversion candidate information MV1 is the WMF format (RTFD 1.1) shown in FIG. 8. The MV1 describes at least a type of required box and an estimate size (or fixed size of a box) of the RTFD 1.1. The moov conversion candidate information MV1 shows that the WMF format contains required boxes of at least 72 bytes. Being required by the maximum moov incremental size estimate process 250, the conversion candidates information memory portion 22 outputs any one of the moov conversion candidate information MV1, MV2, and MV3 as moov conversion candidate information 252.

Figure 13:
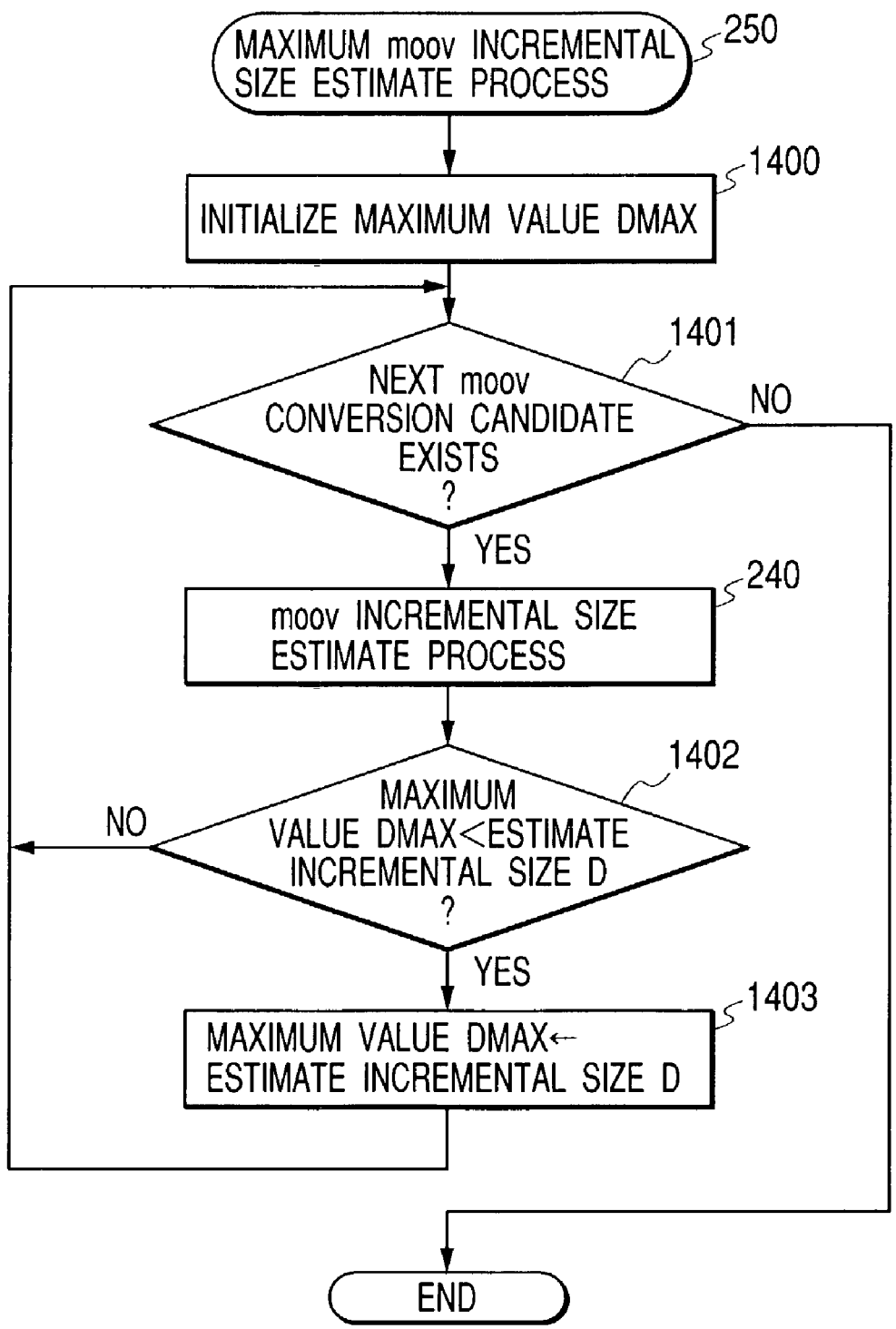
FIG. 13 is a flowchart of a maximum converted moov incremental size estimate process in the MP4 file generating device according to the first embodiment of the present invention.

FIG. 13 is a flowchart of one example of the maximum moov incremental size estimate process 250. First, a variable DMAX is initialized (DMAX=0) to store a maximum size increment (step 1400). Next, in the moov conversion candidate information memory portion 22, whether or not an unprocessed moov conversion candidate exists is determined (step 1401). When the unprocessed moov conversion candidate does not exist, the maximum moov incremental size estimate process 250 outputs the variable DMAX, and finishes. When the unprocessed moov conversion candidate exists, the maximum moov incremental size estimate process 250 obtains the moov conversion candidate information 252 from the moov conversion candidate information memory portion 22 to estimate an moov incremental size of the moov conversion candidate 240 so as to obtain an estimate incremental size D. The moov incremental size estimate process 240 is described hereinafter. The estimate incremental size D and the maximum value variable DMAX (step 1402) are compared to each other. Only when the DMAX<D, D replaces the DMAX (step 1403). Thereafter, the maximum moov incremental size estimate process 250 returns to the step 1401. In the above-described process, the maximum value variable DMAX stores a maximum value among the incremental size values of all moov conversion candidates.

Figure 14:
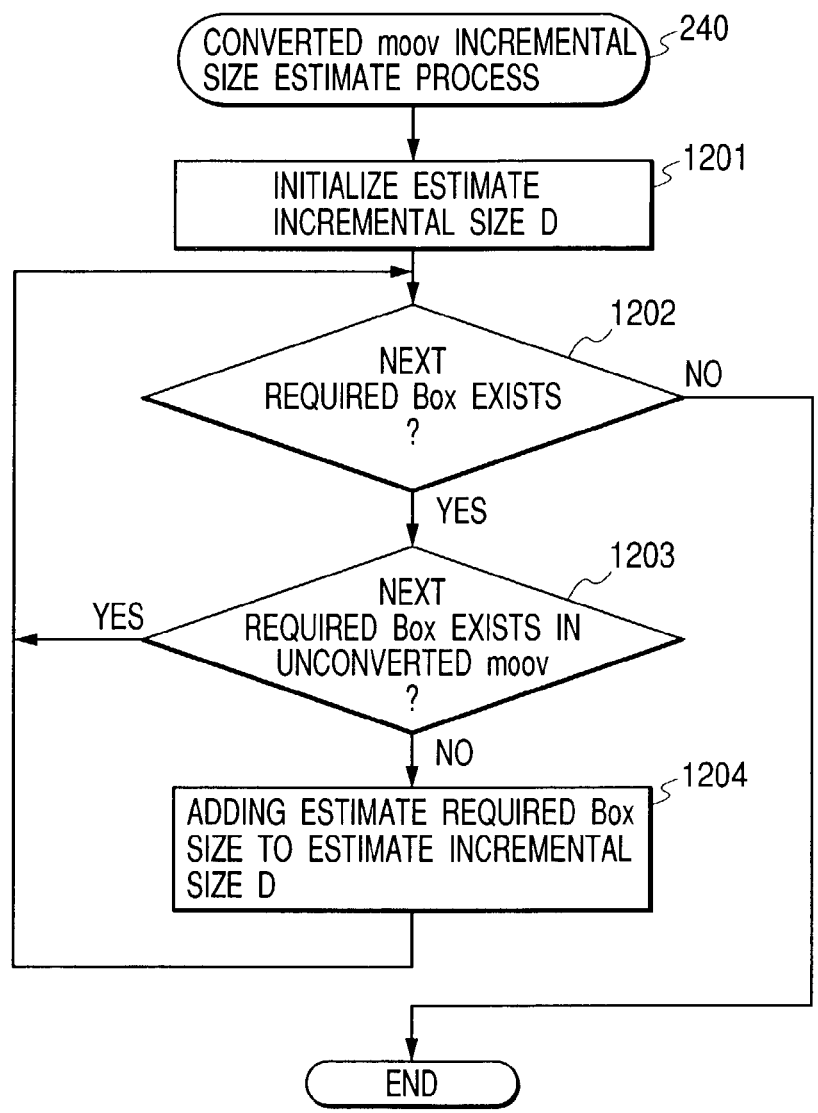
FIG. 14 is a flowchart of a converted moov incremental size estimate process in the MP4 file generating device according to the first embodiment of the present invention.

FIG. 14 is a flowchart of one example of the moov incremental size estimate process 240. In the moov incremental size estimate process 240, first, the estimate value D which stores size increment is initialized (D=0, step 1201).

Next whether or not an unprocessed required box exists in the moov conversion candidates is determined (step 1202). When an unprocessed required box does not exist, the current variable D is determined as the moov estimate incremental size, and the moov incremental size estimate process 240 finishes. When an unprocessed required box exists, whether or not the required box exists in the current moov 111 is determined based on the moov information 223 (step 1203). If the required box exists, the moov incremental size estimate process 240 returns to step 1202. If the required box does not exist, the estimate size of the required box is added to the variable D (step 1204), and the moov incremental size estimate process 240 returns to step 1202. The estimate size of the required box is obtained from the moov conversion candidate information 252.

According to the above-described file storing process 203, in the MP4 file generating device 501 of the first embodiment of the present invention, the MP4 file 204 which contains an overwritable free space is generated and stored in consideration of a future moov conversion process.

Figure 15:
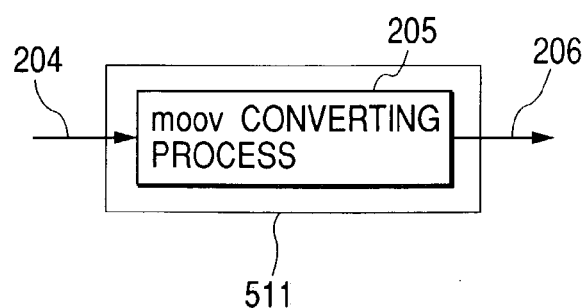
FIG. 15 is a block diagram of an MP4 file converting device according to a second embodiment of the present invention.

FIG. 15 is a block diagram of a structure of an MP4 file converting device 511 according to a second embodiment of the present invention. In the moov converting process 205, the MP4 file converting device 511 converts only the moov 110 in the MP4 file 204 generated by the MP4 file generating device 501 of the first embodiment so as to output the converted file 206.

Figure 16:
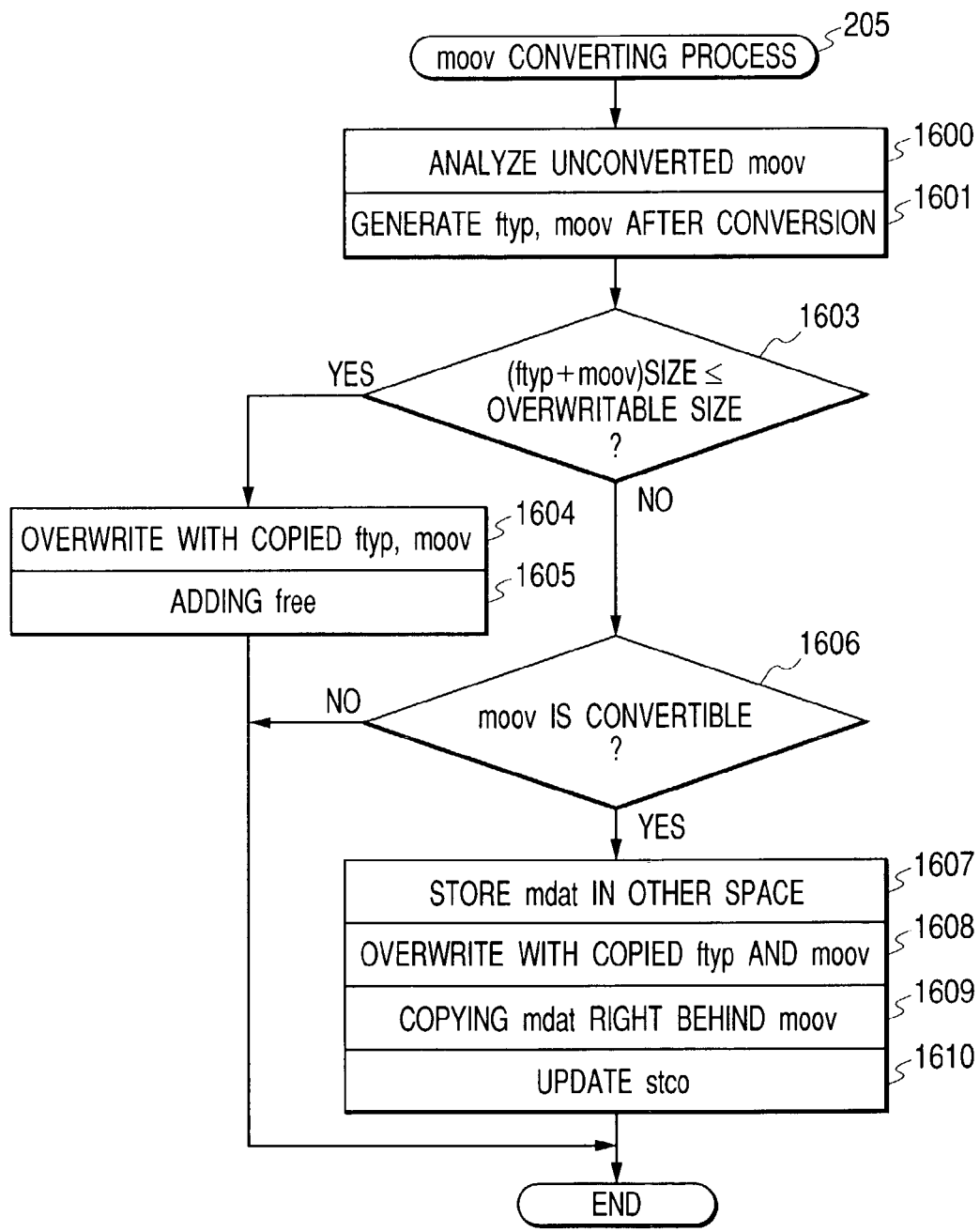
FIG. 16 is a flowchart of an moov converting process in the MP4 file converting device according to a second embodiment of the present invention.

The moov converting process 205 is described in detail in reference to FIG. 16. FIG. 16 is a flowchart of one example process of the moov converting process 205. In the moov converting process 205, an input MP4 file is analyzed to obtain an overwritable data size WS (step 1600). In the first embodiment of the present invention, the overwritable free space size WS is equal to a sum of the sizes of both the free size 221 and the moov 110. Next, after the conversion, an moov 171 and an ftyp 170 are generated based on the moov 110 (step 1601). In the first embodiment of the present invention, the conversion candidates in the moov converting process 205 comply with the MP4 file format defined by the WMF as a streaming delivery format. Whether or not a meta data size of the sum of both the moov 171 and the ftyp 170 is equal to or larger than the overwritable size WS is determined (step 1603).

Figure 17:
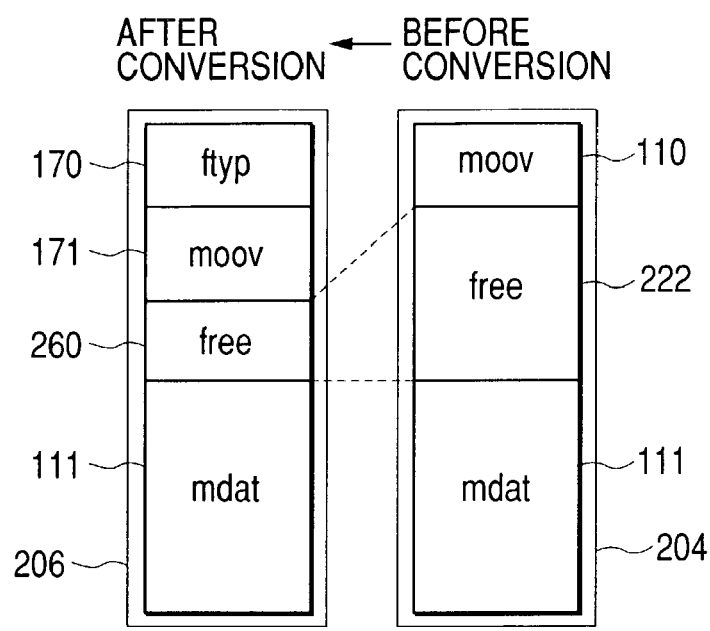
FIG. 17 is a block diagram of structures of the unconverted MP4 file and converted MP4 file according to the second embodiment of the present invention (meta data size after the conversion is smaller than the overwritable size before the conversion).

When the meta data size is smaller than the overwritable size WS, the copied ftyp 170 and the moov 171 overwrite the MP4 file 204 from its beginning (step 1604). The data right behind the moov 171 and right before the mdat 111 of the MP4 file 204 is replaced with an overwritable free space 260 (step 1605) such that the moov converting process 205 finishes. The converted MP4 file 206 has a structure as shown in FIG. 17. In FIG. 17 the unconverted MP4 file 204 of FIG. 10 is also shown for comparing these two files. The size of the overwritable free space 260 in the converted MP4 file 206 basically differs from that of the overwritable free space 222 in the unconverted MP4 file 204 (in some cases these sizes may be same). The mdat 111 does not need to be copied because the position of the mdat 111 does not change between in the unconverted MP4 file 204 and in the converted MP4 file 206. Therefore the file writing process and temporary memory space allocating become unnecessary. Further, as described hereinafter, the rewriting of the stco 164, which represents position information of the chunks in the mdat 111, also becomes unnecessary. An efficient MP4 file format conversion thus becomes possible.

When the meta data is larger than the overwritable size WS, the ftyp 170 and the moov 171 cannot overwrite the position before the beginning of the mdat 111 in the MP4 file 204. In this case, a space is required for temporarily copying the mdat 111 because the position of the mdat 111 changes. When the size of the mdat 111 is large, it may be difficult to allocating a temporary space for copying. Whether or not the moov conversion is possible after the temporary space for copying is allocated is determined (step 1606). If impossible, the moov conversion is not performed, a massage to finish the moov converting process 205 is output, and the moov converting process 205 finishes. If possible, the temporary space for copying is allocated, and the mdat 111 is copied to the temporary space (step 1607). Next, the copied ftyp 170 and the moov 171 overwrite the MP4 file from its beginning (step 1608). The mdat 111 copied in the temporary space overwrites the position just behind the moov 171 (step 1609). The stco 164 in the moov 171 is rewritten because the first position of the mdat 111 changes between in the converted MP4 file 206 and in the unconverted MP4 file 204 (step 1610). Then the moov conversion process 205 finishes.

Figure 18:
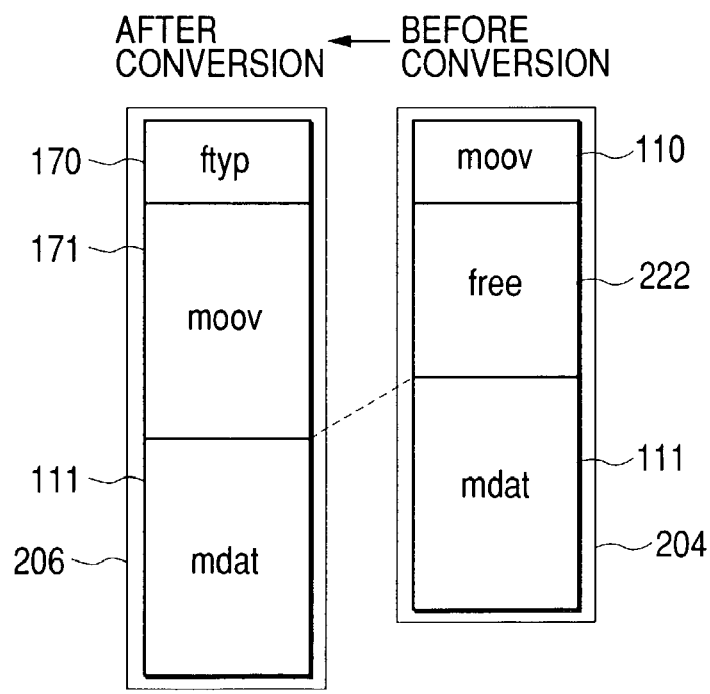
FIG. 18 is a block diagram of structures of the MP4 files before and after the conversion performed by the MP4 file converting device according to the second embodiment of the present invention (meta data size after conversion is larger than the overwritable size before conversion).

FIG. 18 is a structure of the MP4 file 206 generated when the meta data size is larger than the overwritable size WS. As described above, when the overwritable free space in the unconverted MP4 file is not sufficient, the allocating of a temporary copy space and the writing of the mdat 111 into the temporary copy space are needed so that the mdat 111 is processed to move. After the mdat 111 is moved, the rewriting of the stco 164 is also needed. When the size of the mdat 111 is larger, the volume for the above-described process increases such that the MP4 file conversion process becomes inefficient. Therefore it is preferable that the overwritable free space inserted in the unconverted MP4 file 204 is larger in consideration of subsequent moov conversion processes.

The third embodiment of the present invention is an variation of the first or second embodiment. In the maximum moov incremental size estimate process 250 within the file storing process 203, the MP4 file storing device comprises means for specifying one or more candidates memorized in the moov conversion candidate information memory portion 22, wherein the incremental size of the specified candidate is estimated in the moov incremental size estimate process 240, and the estimate incremental size is output as a free size 221.

A fourth embodiment of the present invention is an variation of the first or second embodiment. In the moov incremental size estimate process 240 within the file storing process 203, the file storing device comprises a function of adding not only the required box size in the candidate moov but also an optional box size into the incremental size estimate process so as to be accommodated by an overwritable free space.

A fifth embodiment of the present invention is an variation of the first or second embodiment. In the moov incremental size estimate process 240 within the file storing process 203, the file storing device comprises a function of subtracting a size of the boxes (as one group, marked with 'U') contained in the unconverted moov 110 in the unconverted MP4 file 204 but not contained in the converted moov 171 from the estimate incremental size D. When the file is converted, the sizes and structures of a parent box (which contains the group of the boxes U) and of an upper parent box (which contains the parent box change after conversion). Therefore during the conversion, these sizes and structures are also processed to convert. According to the fifth embodiment, since the incremental size is strictly estimated, no unnecessarily large free size is set.

Figure 19:
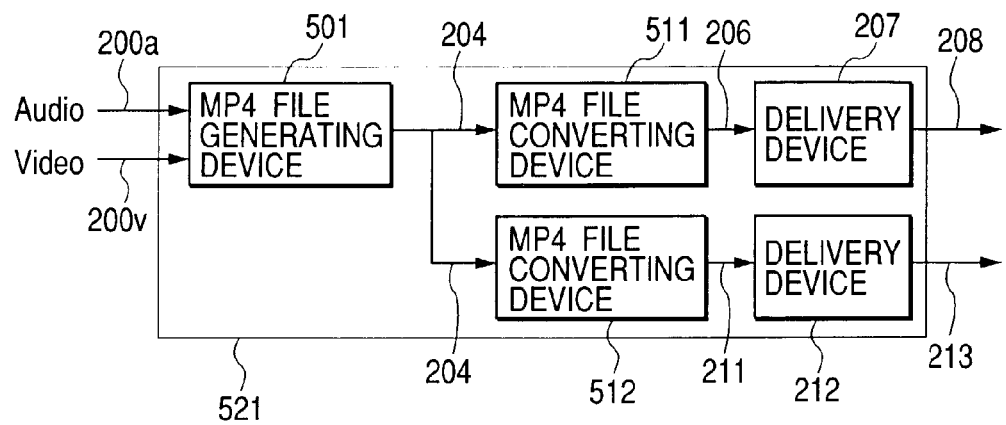
FIG. 19 is a block diagram of a process structure of a delivery server device according to the first embodiment of the present invention.

FIG. 19 is a structure of an MP4 file delivery server 521 of a sixth embodiment of the present invention. The MP4 file delivery server 521 comprises the MP4 file generating device 501 of the first embodiment, the plural MP4 file converting devices (511, 512) of the second embodiment, and plural delivery devices (207, 212) respectively corresponding to the plural MP4 file converting devices 511 and 512. In the MP4 file delivery server 521, the MP4 file 204 generated by the MP4 file generating device 501 is converted to an MP4 file 206 suitable for the file delivery device 207, through the moov converting process 205. Otherwise the MP4 file 204 is converted to an MP4 file 211 suitable for the file delivery device 212, through an moov converting process 209. The delivery devices 207 and 212 respectively process the MP4 files 206 and 211 according to their delivery formats, and then the processed MP4 files 206 and 211 are delivered as streams 208 and 213.

According to the structure of the sixth embodiment, an MP4 file 204 of a given format is converted to plural delivery formats to be delivered. The moov converting processes 209 and 205 have basically the same structures, while the moov formats respectively converted through the moov converting processes 209 and 205 are different from each other.

Figure 20:
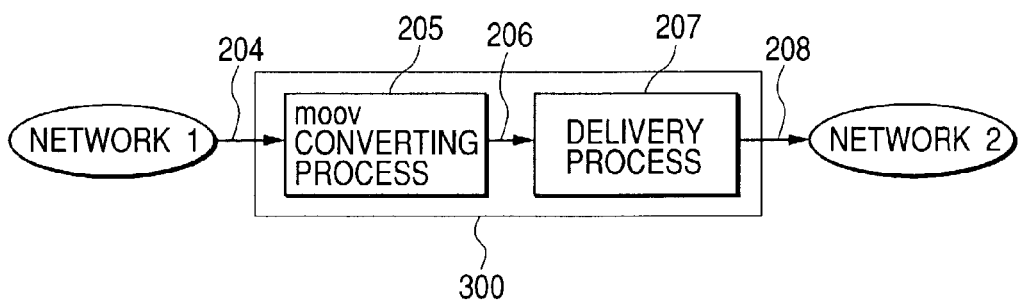
FIG. 20 is a block diagram of a process of gateway device according to a seventh embodiment of the present invention.

In a seventh embodiment of the present invention, a gateway device receives the MP4 file 204 generated by the file storing device of the first or second embodiment via a network 1, and converts it to the MP4 file 206 such that the MP4 file 206 is transmitted via a network 2. FIG. 20 is a block diagram of a structure of a gateway process 300. Each process (205, 207) within the gateway process 300 are the same process as the first or second embodiment. In other words, the embodiment is used in a gateway between the two networks.

In an MP4 receiving terminal device of an eighth embodiment, the MP4 file 204 generated by the file storing device of the first embodiment is received via a network, and is converted to the MP4 file format 206 which the MP4 receiving terminal device itself can reproduce.

Figure 21:
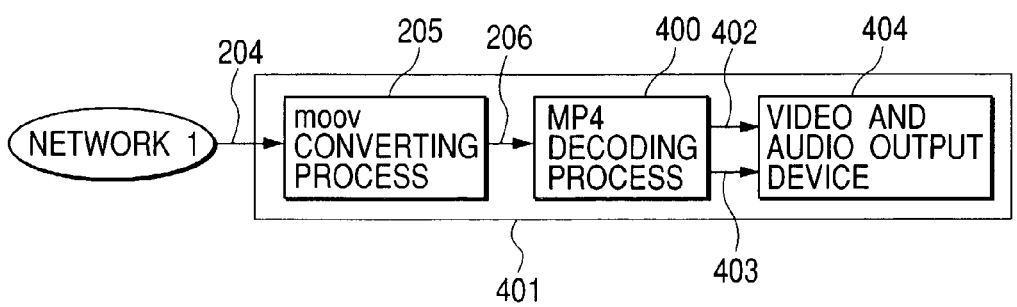
FIG. 21 is a block diagram of a structure of an MP4 file receiving/reproducing device according to an eighth embodiment of the present invention.

FIG. 21 is a block diagram of a structure of an internal process 401 in the receiving terminal device of the sixth embodiment. The MP4 file 204 received via the network 1 is converted to the MP4 file 206 which can be reproduced by the receiving terminal device, through the moov converting process 205. The converted MP4 file 206 is decoded through an MP4 file decoding process 400, and thus is opportunely output as a video data 402 and audio data 403, which are represented to a user by a video/audio output device 404. The moov converting process 205 has the same structure as of the first or second embodiment.

A ninth embodiment is one variation of the first or second embodiment. With external inputs and downloaded files, the MP4 file storing device adds, deletes, updates, and stores the moov conversion candidate information in the moov conversion candidate information memory portion 22.

Figure 22:
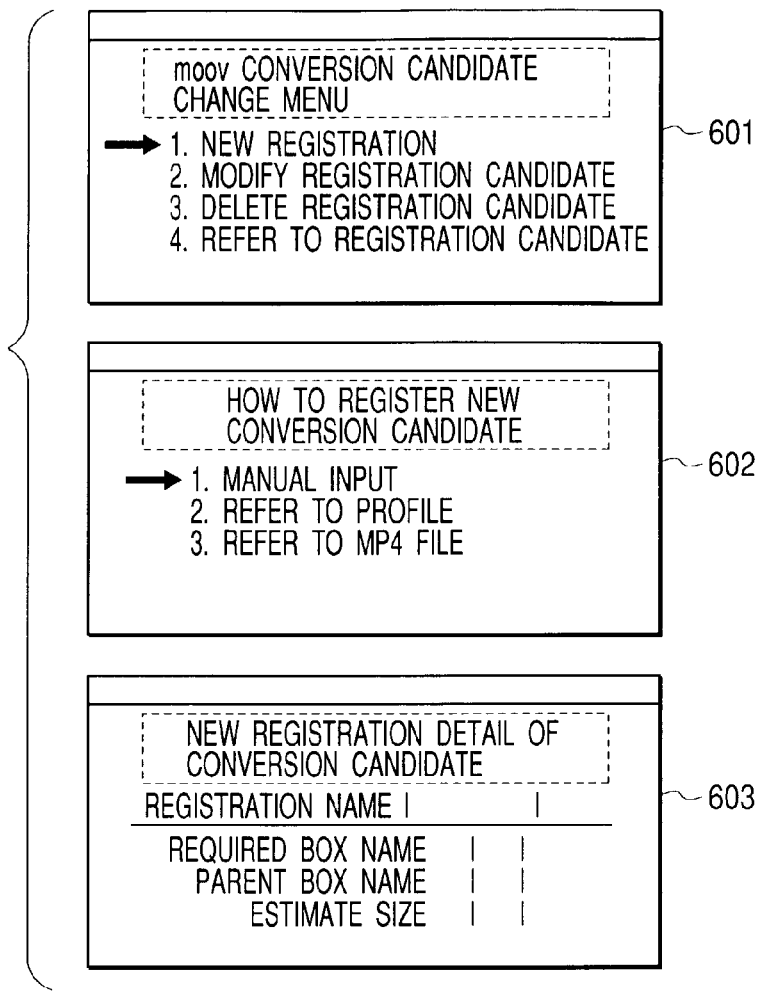
FIG. 22 is an example of a menu screen according to the MP4 file storing device of a ninth embodiment of the present invention.
Figure 23:
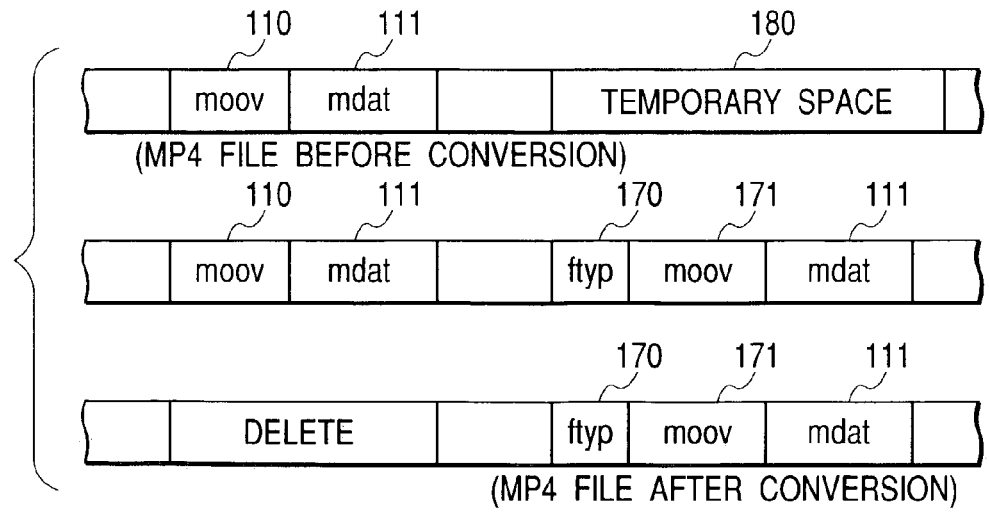
FIG. 23 is a conceptual diagram of an MP4 file converting process according to a prior art.

FIG. 22 is one example of an interface used in adding, deleting, and updating the moov conversion candidate information in the MP4 file storing device of the ninth embodiment. When the information in the moov conversion candidate information memory portion 22 is to be changed, a screen 601 displays for a user to select a candidate information changing method. When the user selects "1. new registration of conversion candidate", a screen 602 displays in the ninth embodiment for the user to select a registration method for registering a new conversion candidate. The screen 602 shows "1. manual input," "2. refer to profile," and "3. refer to MP4 file" as the options. When the user selects "1. manual input," a screen 603 displays, showing the menu and shifting to the input state for a new registration name and new registration box information. In the screen 603, a new registration box name, a parent box name which directly contains the new registration box and an estimate size (number of bytes) of the new registration box are input as the new registration box information. When plural boxes are to be registered, the input of the registration box information to the screen 603 is repeated more than once. In the ninth embodiment, the input new registration box information is registered in the moov conversion candidate information memory portion 22. In the ninth embodiment, when the user selects "2. refer to profile" in the screen 602, the moov conversion candidate information described according to a given format is set as the input source. A file on a disk and data on a flash memory are used as the input source. In the ninth embodiment, when the user selects "3. refer to MP4 file", all box information in a specified MP4 file is registered. The registration function referring to a file simplifies the registration process. The MP4 file storing device of the ninth embodiment always stores new MP4 file formats as conversion candidate information. To easily convert an MP4 file format to the new MP4 file format, the MP4 file storing device generates and contains an MP4 file 204 with an overwritable free space.

A tenth embodiment of the present invention is an variation of the first embodiment. In the file storing device of the tenth embodiment, the free size is specified, and the specified free size is output as a free size 221, through the free size determination process 224.

According to the present invention, a multimedia content storing file (particularly an MP4 file) is converted to meet the use of an application only by overwriting a meta data portion (moov) before a media data portion, without rewriting the media data portion (mdat) which occupies the majority of the MP4 file, and without allocating a memory space for rewriting. An efficient conversion of the MP4 file is possible by reducing processed data and memory space.

In addition, the file offset information (stco) is not rewritten because the file position of the media data portion does not change. Therefore, analyzing and overwriting the file offset information become unnecessary, which is advantageous in mounting and converting the MP4 file efficiently.

The present invention is available for all devices and applications that need a file conversion, such as a delivery format conversion in a delivery server device and a gateway device, or a file format conversion and file upgrade in a file reproducing device.

This invention is especially effective in converting file formats in a portable digital device with restrictions in operation capability or memories, such as a PDA and a cellular phone. In cases of transferring MP4 files between any two of such portable devices, it is very efficient to convert the file into another MP4 file format by the sending or receiving digital device by applying the invention before or after the transmission. For example, when a received MP4 file format is un-reproducible with the receiving terminal, the receiving terminal converts it into an MP4 file format that can be reproduced therein efficiently.

Also, this invention can be applied in an MP4 distribution server. According to this invention, the contents accumulated in the distribution server of one file format are efficiently changed into one or more other formats so as to be distributed to the computers supporting different kinds of file formats.

When distributing and exchanging contents between a server and a personal digital assistant, etc., the conversion or upgrade of a file format can be carried out efficiently with this invention. As such, the number of the terminals which can adapt the contents of one file format into another increases so as to promote the circulation of the contents.

The principles, preferred embodiments and modes of operation of the present invention have been described in the foregoing specification. However, the invention which is intended to be protected is not limited to the particular embodiments disclosed. The embodiments described herein are illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A media data file generating device, comprising:
   a file generator which generates an encoded file from a first media data file of a first media file format, said first media data file containing first media data which includes video and sound, and a first meta data which is positioned before the first media data and includes information required for reproducing the video and the sound; and
   a free space generator which generates an overwritable free space to be inserted between the first media data and the first meta data,
   wherein said encoded file from said file generator is configured as a data stream containing said first meta data, said overwritable free space, and said first media data sequentially.

2. The media data file generating device according to claim 1, wherein the meta data documents at least a media data structure of data elements of the media data.

3. The media data file generating device according to claim 1, further comprising means for specifying a size of the inserted overwritable free space.

4. The media data file generating device according to claim 1, further comprising means for storing plural media data file formats thereby converting a media data file between two of the media data file formats.

5. The media data file generating device according to claim 4, further comprising means for determining a size of the overwritable free space based on a specified media data file format.

6. The media data file generating device according to claim 4, further comprising means for specifying one of the media data file formats.

7. The media data file generating device according to claim 4, comprising means for registering at least one new media data file format.

8. The media data file generating device according to claim 1, wherein the file generator includes means for calculating a size C of data which does not exist in the first media data file format and is required for a second media data file format, and means for inserting the overwritable free space of a size equal to or larger than the size C.

9. The media data file generating device according to claim 8, wherein the file generator further includes means for deleting data which exists in the first media data file format and is not required for the second media data file format, and means for updating contents of other data affected by the deleting process.

10. The media data file generating device according to claim 9, wherein the file generator further includes means for calculating a size D of data which exists in the first media data file format and does not exist in the second media data file format, and means for inserting an overwritable free space of a size E equal to or larger than a size of a difference between the size D and the size C.

11. The media data file generating device according to claim 1 is incorporated in a portable device.

12. A media data file converting device comprising:
    an input unit which inputs a first media data file containing first media data which includes video and sound, and first meta data which is positioned before the media data and includes information required for reproducing the video and the sound;
    a free space generator which generates an overwritable free space to be inserted between the first media data and the first meta data;
    a converter which performs a process for converting the first media data file of a first media data file format into a second media data file of a second media data file format by converting the first meta data into a second meta data included in the second media data file format; and
    an output unit which outputs the second media data file, wherein at least said second meta data is overwritten into said overwritable free space positioned between said first media data and said first meta data, when said process for converting is performed.

13. The media data file converting device according to claim 12, wherein the converter includes means for comparing a first size of data before the first media data in the first media data file format with a second size of data before media data in the second media data file format.

14. The media data file converting device according to claim 13, wherein, when the first size is larger than the second size, a space before the first media data in the first media data file is overwritten with the second meta data.

15. The media data file converting device according to claim 13, further comprising:
    means for determining whether to temporarily memorize the first media data depending upon whether the first size is smaller than the second size as determined by the comparing means;
    means for memorizing the first media data when the first size is determined to be smaller than the second size by the determining means;
    means for copying the first media data memorized in the temporarily memorizing means;
    means for overwriting the second meta data into a space taken by the first meta data and the overwritable free space, and a space F therebehind which are included in a space taken by the first media data file; and
    means for overwriting the copied first media data right behind the space F.

16. The media data file converting device according to claim 15, further comprising:
    means for determining whether to temporarily memorize the first media data depending upon whether available memory in the device is sufficient for temporarily memorize the first media data; and
    means for terminating the device when the first size is determined to be bigger than the available memory in the device.

17. The media data file converting device according to claim 12 is incorporated in a portable device.

18. A media data file conversion method, comprising steps of:
    inputting a first media data file containing first media data which includes video and sound, and first meta data which is positioned before the media data and includes information required for reproducing the video and the sound;
    comparing a first size of data before the first media data in the first media data file format with a second size of data before media data in a second media data file format;
    converting the first meta data into a second meta data included in the second media data file format;
    overwriting the second meta data into an overwritable free space inserted between the first meta data and the first media data, based on a result of said comparing step; and
    outputting the second media data file.

19. The media data file conversion method according to claim 18, wherein the overwriting step is proceeded if the first size is larger than the second size.

20. The media data file conversion method according to claim 18, further comprising:
    determining whether to temporarily memorize the first media data depending upon whether the first size is smaller than the second size as determined in the comparing step;
    temporarily memorizing the first media data when the first size is determined to be smaller than the second size and the available memory in the device in the determining step;
    copying the first media data memorized in the temporarily memorizing step;
    overwriting the second meta data into a space taken by the first meta data, the overwritable free space, and a space F therebehind which are included in a space taken by the first media data file; and
    overwriting the copied first media data right behind the space F.

* * * * *